United States Patent
Ammer et al.

(10) Patent No.: US 7,325,979 B2
(45) Date of Patent: Feb. 5, 2008

(54) METHOD FOR RELEASABLY CONNECTING TWO GROUPS OF OPTICAL FIBERS, AND PLUG-IN CONNECTOR FOR CARRYING OUT SAID METHOD

(75) Inventors: Thomas Ammer, Pfäffikon (CH); Uhland Goebel, Wila (CH); Martin Strasser, Zürich (CH); Falk Draheim, Pfäffikon (CH); Peter Nuechter, Stein (CH); Carlo Compare, Winterthur (CH)

(73) Assignee: Huber + Suhner AG, Pfäffikon (CH)

( * ) Notice: Subject to any disclaimer, the term of this patent is extended or adjusted under 35 U.S.C. 154(b) by 0 days.

(21) Appl. No.: 11/343,285

(22) Filed: Jan. 30, 2006

(65) Prior Publication Data

US 2006/0159402 A1    Jul. 20, 2006

Related U.S. Application Data

(63) Continuation of application No. PCT/CH2004/000347, filed on Jun. 8, 2004.

(30) Foreign Application Priority Data

Jul. 31, 2003  (CH) .................................. 1341/03

(51) Int. Cl.
  *G02B 6/38* (2006.01)
(52) U.S. Cl. ................ 385/71; 385/70; 385/54; 385/59
(58) Field of Classification Search ............ 385/53, 385/54, 55, 59, 70, 71
See application file for complete search history.

(56) References Cited

U.S. PATENT DOCUMENTS

| 4,323,300 | A | 4/1982 | Stewart et al. |
| 4,907,335 | A | 3/1990 | Egner et al. |
| 5,381,498 | A | 1/1995 | Bylander |

(Continued)

FOREIGN PATENT DOCUMENTS

EP    0 961 142 A1    12/1999

(Continued)

OTHER PUBLICATIONS

M. Kobayashi, et al., "Patterned Optical Ribbon Fibre with Fibre Physical Contact Connector for Optical Fibre Interconnection," Electronics Letters, IEE Stevenage, GB, vol. 33, No. 20, Sep. 25, 1997, pp. 1728-1730.

*Primary Examiner*—Kevin S. Wood
(74) *Attorney, Agent, or Firm*—Burr & Brown

(57) ABSTRACT

Disclosed is a method for removably connecting two groups of individual, parallel fibers that are delimited by end faces that are perpendicular to the fiber axis. The two groups of fibers are moved towards each other in an axial direction until each of the fibers abuts against the end face of the assigned fiber from the other group. The fibers of the two groups are aligned in pairs relative to each other before being moved into contact with each other, and any differences in fiber lengths is compensated for by elastically deforming the fiber along the fiber main axis. This method eliminates the disadvantages associated with bending the fibers because length variations are essentially compensated for by axially compressing the fibers.

36 Claims, 9 Drawing Sheets

U.S. PATENT DOCUMENTS

| | | |
|---|---|---|
| 5,436,993 A | 7/1995 | Antonini et al. |
| 6,371,661 B1 | 4/2002 | Meadowcroft |
| 6,582,134 B2 * | 6/2003 | Otera .......................... 385/65 |
| 6,951,425 B2 * | 10/2005 | Vergeest ...................... 385/59 |
| 2002/0003933 A1 | 1/2002 | Sherrer et al. |

FOREIGN PATENT DOCUMENTS

| | | |
|---|---|---|
| EP | 1 241 500 A2 | 9/2002 |
| JP | 08-110441 A1 | 4/1996 |
| WO | WO 02/056060 A2 | 7/2002 |

* cited by examiner

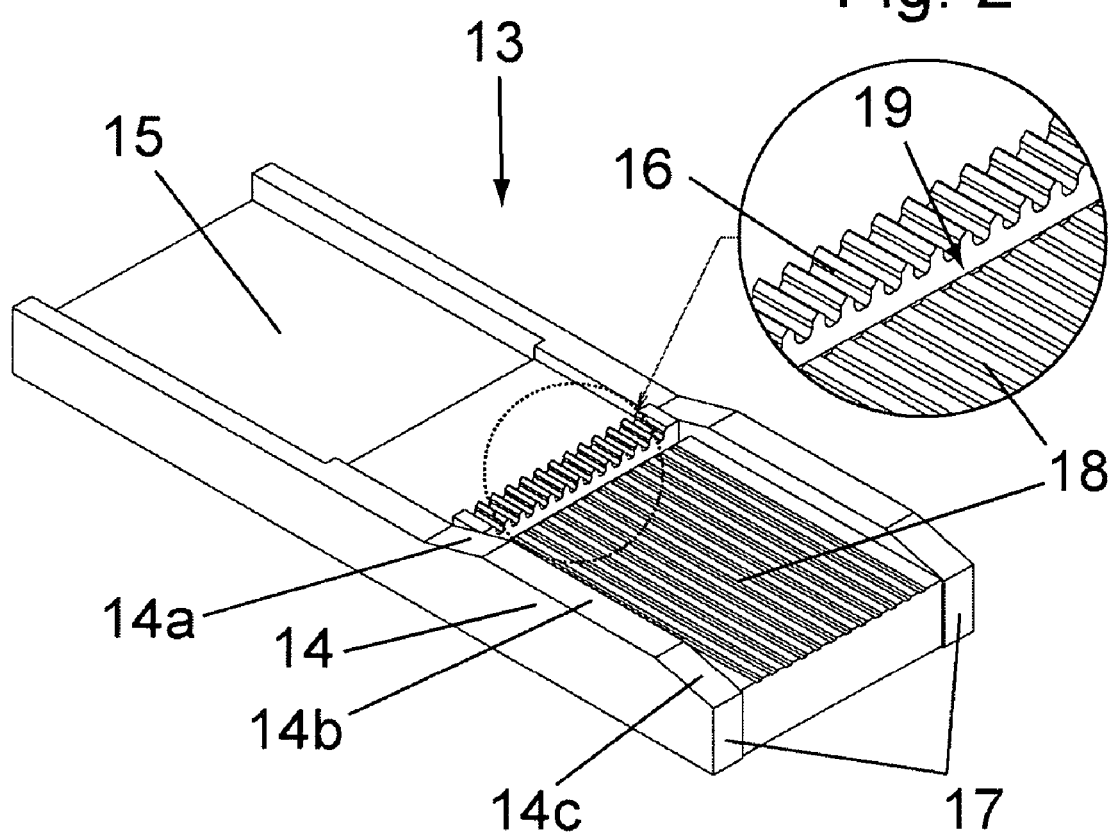

METHOD FOR RELEASABLY CONNECTING TWO GROUPS OF OPTICAL FIBERS, AND PLUG-IN CONNECTOR FOR CARRYING OUT SAID METHOD

CROSS REFERENCE TO RELATED APPLICATION

This application is a continuation of International Application No. PCT/CH2004/000347 having an international filing date of Jun. 8, 2004, and which designated the United States, the entirety of which is incorporated herein by reference.

FIELD OF THE INVENTION

The present invention relates to the field of information transmission by means of optical fibers. It concerns a method for releasably connecting two groups of optical fibers arranged in parallel and delimited by end faces that end in a plane transverse to the fiber main axis, and a plug-in connector for carrying out the method. Such a method is known for example from the document US-B2-6,582,134.

BACKGROUND OF THE INVENTION

In the art of optical information transmission by means of glass fiber cables, for reasons of increasing integration there is the desire for a ferrule-less fiber optical plug-in connector of high packing density. The applications of such a connector lie, for example, in the area of optical interconnects (rack-rack, backplanes), optical distributors or fiber management systems. As a result of the likely increase in the number of optical connections within these systems, the requirement for higher integration is increasing, as a consequence of which the requirements for the connecting technique are also continually increasing.

The solutions already available today are for the most part based on miniaturized variants of individual ferrule plug-in connectors or on so-called MT ferrules (MT=mechanical transfer) or compatible techniques. In today's fiber distributing systems, the distributing strips provided with the plug-in connectors make up a significant proportion of the overall space requirement.

The single-ferrule variants offer the tried-and-tested quality and reliability and can often be configured "in the field" in a simple way. However, the potential for further miniaturization and for lowering the production costs is limited. It has also already been proposed (U.S. Pat. No. 5,436,993) to connect multifiber cables to one another in a plug-in connection by means of a multiplicity of individual ferrules. However, the construction of these multiple plug-in connectors with single ferrules is complicated and elaborate and leads to comparatively high plug-in forces.

In the case of the connectors based on MT ferrules (see, for example, FIG. 7 of the initially cited U.S. Pat. No. B2-6,582,134), the high packing density is obtained, but the performance and reliability are usually only adequately ensured in multimode operation (MM). There, connectors of this type have been able to establish themselves almost as standard, in particular in the case of MM transceiver modules. Although single-mode variants (SM) are available, they impose very high requirements on the production technologies and are consequently relatively expensive to produce. Moreover, the high precision in the positioning of the fibers that can be achieved with the molded (usually injection-molded) parts of the MT ferrules is partly undermined by the cummulative tolerances over the guiding pins, which are made with relatively great dimensions in relation to the fibers. The ferrule, which is usually produced from thermoplastic and in which these pins are embedded, is subjected to high mechanical loads when it undergoes repeated plugging and unplugging and temperature fluctuations. This and the fact that individual dirt particles can endanger the functional capability of a number of fiber connections based on the large contact area, represents a significant risk to reliability.

Apart from these two approaches, examples of plug-in connectors that manage without a ferrule (ferrule-less or bare fiber or BF connectors) also already exist. Mention should be made here of the Volition™ family from the 3M company (see for example U.S. Pat. No. 5,381,498), the OptoClip® connector from the Deutsch company and, in particular, the fiber PC (FPC) connector from the NTT company (with "funnel hole" centering element; see for example the article by M. Kobayashi et al., Injection Molded Plastic Multifiber Connector Realizing Physical Contact with Fiber Elasticity, IEEE J. Selected Topics in Quantum Electronics, Vol. 5, No. 5, pages 1271-1277 (1999) and FIGS. 8A and 8B of the initially cited US-B2-6,582,134). All three of these examples are based on the principle of fibers bent in an S-shaped manner ("buckling") and individual alignment of the individual fibers. However, only in the case of the NTT solution is a high packing density ensured from the outset. A further development of the FPC connector (EP-A2-1 241 500) uses a V-shaped profile, in which the inserted fibers are pressed against the walls by bending produced on insertion, and are thereby precisely aligned instead of funnel hole openings. A similar principle, based on "buckling", is also realized in the case of WO-A2-02/056060. In the initially cited US-B2-6,582,134, the "buckling" is combined with an alignment of the individual pairs of fibers on insertion by means of V grooves.

All of these approaches that are based on the buckling principle assume that it is necessary to compensate for a very high linear tolerance of the fiber ends (absolutely and between the fibers), caused by the preparation and/or different thermal expansion of the connector components involved. The latter effect comes to bear in particular when standard polymers are used in the injection molding of plastics.

In this respect, the buckling principle offers a clear advantage: it is possible to compensate for linear tolerances of an order of magnitude of up to ±50-100 µm without any problem, the pressing pressure between the two buckled fiber ends remaining virtually constant.

However, the relatively strong deformation of the fibers also entails decisive disadvantages: on the one hand, the buckling does not go below a minimum bending radius, in order to avoid additional optical losses (specifically polarization-dependent losses). As a result, the minimum overall length of the plug-in connectors is limited. On the other hand, the risk of fiber rupture is increased by the flexural stresses, as a consequence of which the reliability may be impaired. Finally, the radially non-symmetric stresses occurring during the buckling of the fibers may lead to permanent changes in the optical transmission behavior. Although allowance are made for these problems by using special fibers with greater bending resistance or specially coated glass fibers, such additional measures increase the production costs and make acceptance by users more difficult.

Furthermore, in US-B1-6,371,661 it has been proposed for multifiber plug-in connectors, such as, for example, the aforementioned MT plug-in connector, in which the fibers to be connected are fixed in bores in a common ferrule, to provide an increased overhang of the fibers beyond the front sides of the ferrules of 5 to 100 μm to bring the end faces of the fibers into contact with one another with good quality, while utilizing the elasticity of the fibers. As can be concluded from comments made in U.S. Pat. No. 4,907,335, the good contact that can be achieved with this solution is obviously attributed to a "buckling" that occurs in the region of the increased overhang of the fibers.

SUMMARY OF THE INVENTION

The object of the invention is to provide a method for releasably connecting two groups of optical fibers which avoids the disadvantages of known solutions, in particular the disadvantages accompanying the "buckling" or bending of the fibers, and at the same time, makes precisely aligned and optically high-quality contact of all the pairs of fibers possible, and also provides a plug-in connector for carrying out the method that can be inexpensively produced.

The object is achieved by releaseably connecting two groups of individual optical fibers arranged in parallel and delimited by end faces that end in a plane transverse to the fiber main axis in which the individual fibers are aligned with one another in pairs. The two groups are moved toward each other until each of the fibers abuts against the end face of the assigned fiber from the other group, and any differences in fiber lengths are compensated for by the axial compression of the fiber (elastic deformation). In addition a plug-in connection is provided that comprises a coupling and two connector parts that can be inserted from opposite sides into the coupling and in which each group of fibers are movably supported over a predetermined free length on an associated fiber block in the connector. The coupling includes means for aligning the two groups of fibers in pairs, and inserting the connector parts into the coupling fixes the fibers over the predominant part of their free length in the lateral direction and compresses the fibers in the axial direction.

According to a preferred embodiment of the method of the present invention, the individual fibers of the two groups are movably supported over a predetermined free length, and the fibers are fixed in the lateral direction over the predominant part of their free length during alignment. The lateral fixing effectively makes virtually the entire free length of the fibers available for the elastic compression, so that the compressive stress accompanying a fiber length variation tolerance compensation is homogeneously distributed over the free length of the fibers, and consequently the elastic deformations are kept small.

Preferably, each group of fibers is assigned a fiber block as a holding element, each group being firmly connected, specifically adhesively bonded or cast, to the associated fiber block in the rear part of the fiber block, and each fiber lying movably with the free length on the associated fiber block before the alignment. Each of the fiber blocks has an end face oriented transversely in relation to the fiber axis. The fibers lying on the fiber block are cut to length in such a way that they have an overhang with respect to the end face of the fiber block. For connecting the two groups of fibers, the two fiber blocks are pressed with their end faces against one another in such a way that the overhanging fibers are compressed in the axial direction. With preference, the overhang of the fibers beyond the end faces of the fiber blocks is several micrometers, preferably between 5 and 20 micrometers.

The configuration of the end face of the fiber blocks does not necessarily have to comprise a simple planar face here, but may include recesses or structures suitable for the purpose of laterally centering the two fiber blocks to be connected when in the plugged state.

According to another preferred embodiment of the method of the present invention, an aligning element is used for aligning and fixing the fibers, which extends in the axial direction substantially over the free lengths of both fibers of a pair of fibers to be connected, and which has for each pair of fibers a guiding profile that runs in the axial direction and is preferably axially invariant.

Another preferred embodiment of the present invention is distinguished by the fact that the aligning element for aligning and fixing the fibers is lowered onto the fiber blocks in a relative movement that is transverse in relation to the fiber's axial direction until the fibers lie in pairs in the associated guiding profile and are laterally fixed. The movement of the aligning element in relation to the fiber blocks takes place coupled with the relative movement of the fiber blocks in relation to one another, and the coupling of the movements of the fiber blocks and of the aligning element takes place by means of lateral guiding geometries on the fiber blocks and side guides acting with them on the aligning element. As a result, simple and reliable alignment and fixing of the pairs of fibers can be achieved. It goes without saying that the means for coupling the movements of the fiber blocks and of the aligning element may also be differently configured and placed at different locations of the plug-in connection within the scope of the invention.

It is particularly advantageous if the guiding profiles in the aligning element become narrower with increasing depth vertically in relation to the guiding direction, in particular are formed in a V-shaped manner, and if, during the alignment and fixing, the pairs of fibers are pressed into the guiding profiles by elastically deformable means attached to the fiber blocks.

A preferred refinement of the plug-in connection according to the invention is characterized in that the aligning means in the coupling comprise an aligning element which is movably supported transversely in relation to the axial direction relative to the fiber blocks and has for each of the pairs of fibers, on a side facing the fibers, a guiding profile that is invariant in the axial direction.

In particular, each of the fiber blocks has an end face oriented transversely in relation to the fiber axis, and the fibers lying on the fiber block are cut to length in such a way that they have an overhang with respect to the end face of the fiber block, the overhang of the fibers beyond the end faces of the fiber blocks being several micrometers, preferably between 5 and 20 micrometers.

In order to achieve a reliable, predetermined sequence of the aligning and fixing operations on insertion, the plug-in connection is formed in such a way that, when the connector parts are inserted into the coupling, the aligning element performs a relative movement transverse in relation to the fibers axial direction coupled with the relative movement of the fiber blocks in relation to one another, and a coupling means is provided for coupling the movements of the fiber blocks and the aligning element. The fiber blocks preferably have, as coupling elements, guiding geometries extending in the axial direction on the longitudinal sides. More specifically, the fiber blocks have variable-height guiding rails, which interact in a guiding manner with the aligning element when the connector parts are inserted.

The guiding profiles of the aligning element are preferably formed as V-shaped grooves, and the fiber blocks comprise the means which, in interaction with the guiding profiles, bring about the alignment and lateral fixing of the fibers. Specifically, the aligning and fixing means comprising either axially running fiber grooves or elements that are elastically deformable transversely in relation to the axial direction. For example, the aligning and fixing means may be in the form of a flexible membrane or an elastic layer or individual spring elements or a flexible structure element.

The plug-in connector construction and preassembly are simplified if the groups of fibers are adhesively bonded with the fiber blocks, and the fibers of each group are guided by fiber holding combs, which are formed on the fiber block, to limit the adhesive bonding in the axial direction and determine the free length of the fibers.

The fiber blocks preferably consist of a dimensionally stable material that is adapted to the fibers in the coefficient of thermal expansion, in particular, a ceramic material. In addition, the fiber blocks may be polished on the end faces. In contrast, the aligning element is preferably produced from a plastic material, and, more specifically, by an injection-molding process. To increase the surface hardness of the associated guiding profiles and to reduce the sliding friction of the fibers on the surface, it may be coated with a dielectric or metallic material or a combination of materials.

BRIEF DESCRIPTION OF THE DRAWINGS

The invention is to be explained in more detail below on the basis of various embodiments shown in the drawing, in which:

FIG. 1 shows a perspective side view of a fiber block for a plug-in connection according to one embodiment of the present invention;

FIG. 2 shows a perspective plan view of the unbonded fiber block according to FIG. 1 detailing the fiber grooves, the fiber holding comb and a trench-like depression acting as an adhesive barrier;

DETAILED DESCRIPTION OF THE INVENTION

Figure 3:
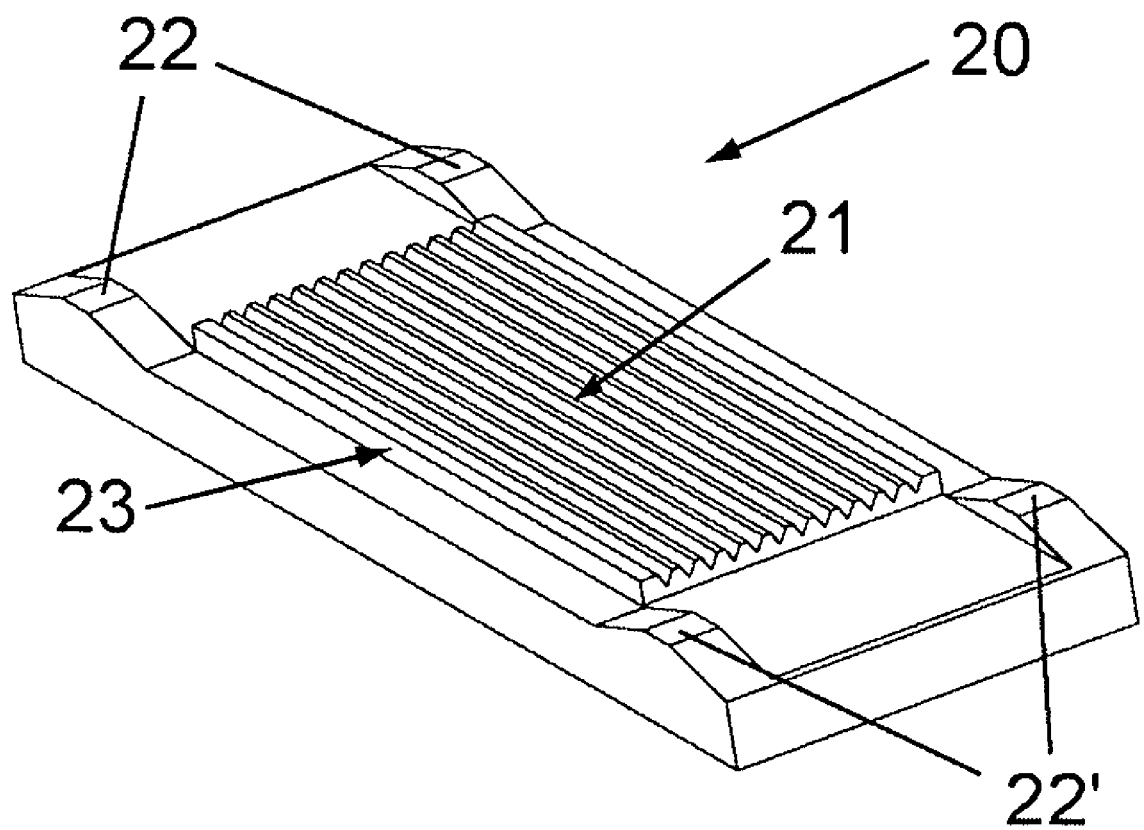
FIG. 3 shows a perspective side view of an aligning element for the alignment and lateral fixing of the fibers in the plug-in connection in one embodiment of the present invention.

The present invention is designed in such a way that it meets the following requirements without a ferrule:
suitable for monomode and multimode
low insertion loss
temperature range: $-40° \ldots 85°$ C.
high plugging reliability
high mechanical stability
connection of multifiber cables (with preferably 8 or 12 single fibers) or any number of single fibers
plug-in connector for any contact spacing and diameter of the fibers (preferably fibers with a diameter of 125 micrometers and equidistant spacing of 250 micrometers)

The basic physical necessities for efficient optical coupling between two fibers in physical contact (PC) comprise adequately good mutual lateral centering, best possible surface quality of the fiber end face and a minimal axial pressing force of the order of magnitude of about 0.4 N per fiber (see for example the article by M. Kobayashi et al., Injection Molded Plastic Multifiber Connector Realizing Physical Contact with Fiber Elasticity, IEEE J. Selected Topics in Quantum Electronics, Vol. 5, No. 5, pages 1271-1277 (1999)). The smooth surface and the pressing pressure have the effect in particular of minimizing the back reflections (given by the attenuation value). It is decisive here that these conditions are ensured over the entire temperature range, and over the entire operating period.

The functional principle of the plug-in connection of the present invention is based on individual centering of the individual fibers of the array in relation to their respective partners (i.e., centering in pairs). This preferably takes place within a structure similar to an axial V groove (i.e., in general terms in a guiding profile that is invariant in the axial direction of the fiber) in which the two fibers are aligned in relation to one another without excessive mechanical complexity, by means of merely two reference surfaces.

Assuming the fibers to be coupled lie optimally against the surfaces of the guiding profile, the only decisive factors for the positioning tolerances are the core eccentricity as well as the ellipticity and tolerance of the outside diameter of the fibers.

It is important that a linear, elastic compression of the fibers in the axial direction ensures the necessary pressing pressure of the fibers against one another. This linear compression must be made sufficient for it to be possible to compensate for the linear tolerances caused by working and thermal expansion, without, as far as possible, exceeding the limiting force for the bending of the fibers. This obviates buckling problems and the geometrical conditions can be kept as simple as possible. Furthermore, undesired anisotropic loads of the fibers can be largely avoided in this way. With ideal compression (i.e., centrally and without an initial bending moment), only isotropic stresses occur, which have little influence on the reliability of the fibers. However, a consequence of this chosen approach is that there are special requirements for the precision of the working of the fibers and the choice of material.

The following explanation of a preferred embodiment of the present invention concentrates on the main elements of the novel plug-in connection and how they interact during the inserting operation. The overall configuration and design of the plug-in connectors with the necessary housings, engaging and disengaging devices, tension reliefs, screw connections and the like have been omitted for better overall clarity and can be added in a suitable way by a person skilled in the art.

Figure 7:
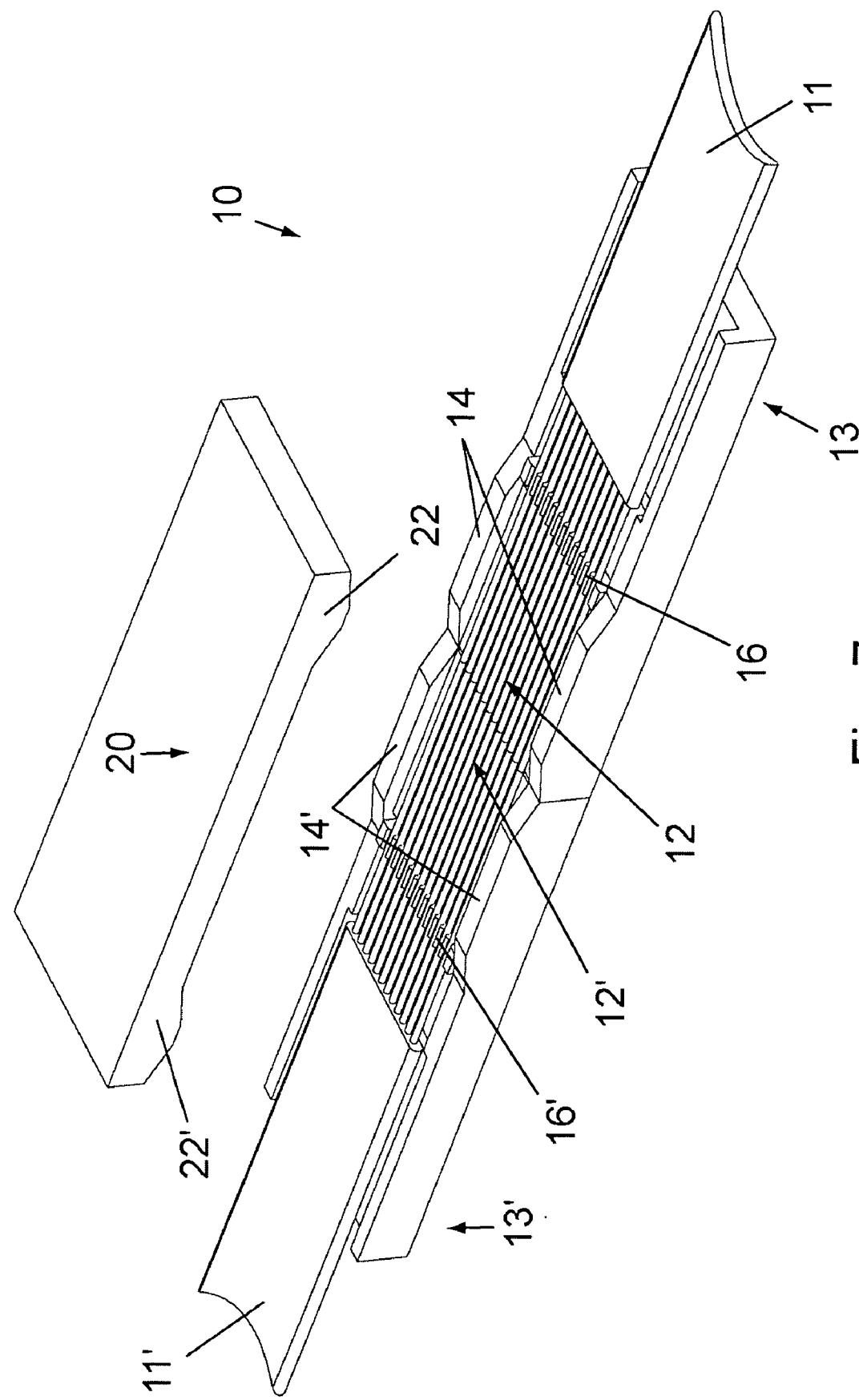
FIG. 7 shows the alignment of the two fiber blocks in the inserted state of the plug-in connection in one embodiment of the present invention with the aligning element being shown lifted off to allow viewing.
Figure 8:
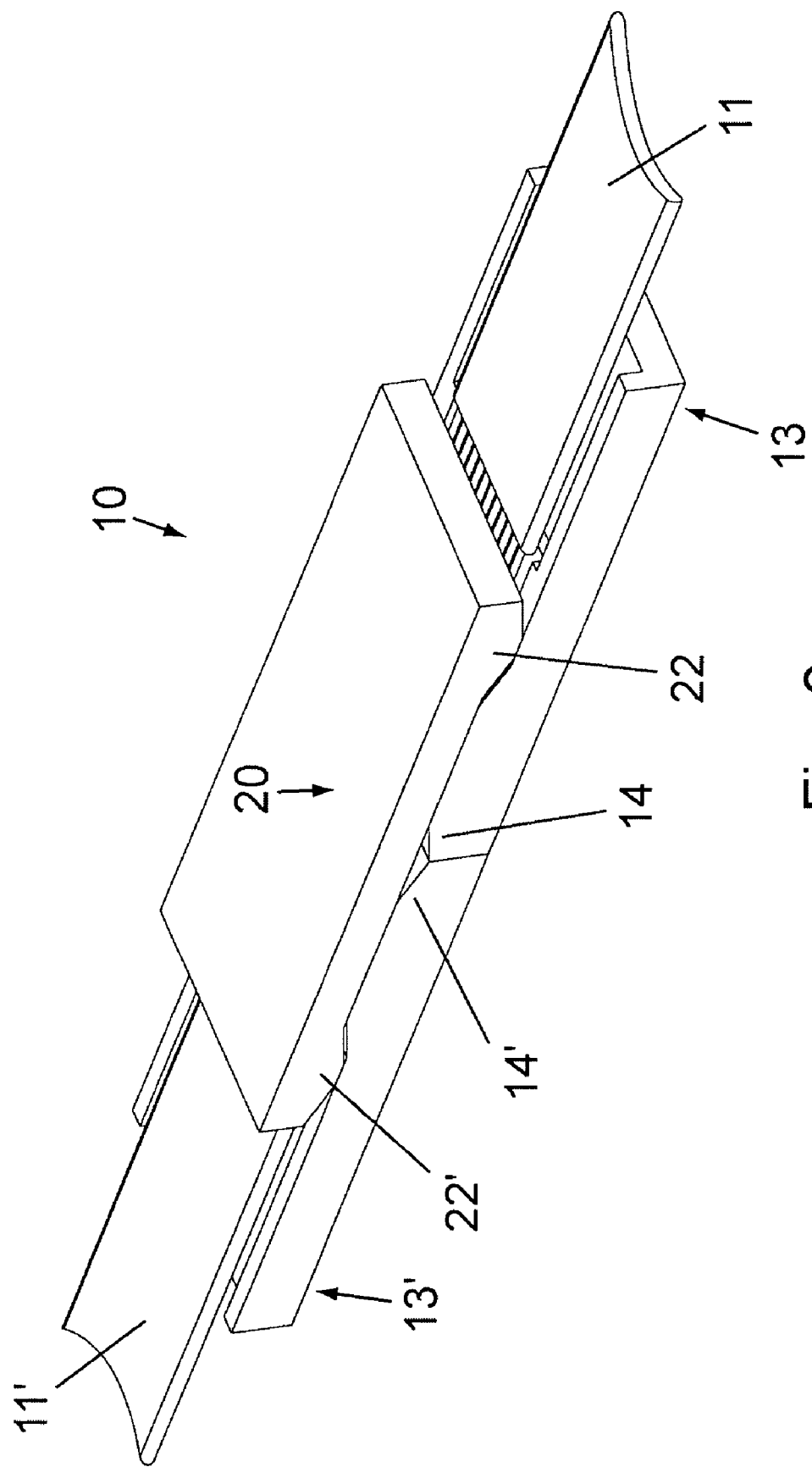
FIG. 8 shows the actual alignment of the two fiber blocks and the aligning element in the inserted state of the plug-in connection given by way of example.

The central elements of a preferred embodiment of the plug-in connection according to the present invention are shown in relation to one another in FIGS. 7 and 8. In FIG. 7, plug-in connection 10 comprises two connector parts referred to as fiber block 13 or 13' (S1 and S2 in FIG. 9), each with a holding element for a group of fibers of a multifiber cable, and a centering or aligning element 20 (coupling K in FIG. 9).

The fiber block, 13 and 13', (in a way analogous to the ferrule) receives a group of fibers, 12 or 12', of a multifiber cable, 11 or 11', respectively. However, unlike a ferrule the individual fibers, 12 and 12', rest loosely and roughly pre-centered on the surface of the front part of the fiber block, 13 and 13', and have a defined overhang of several micrometers, preferably 5 to 20 micrometers, beyond the front edge (end face 17 of FIG. 1) of the fiber block 13 and 13'. The compression of the fibers, 12 and 12' is set by means of this overhang. The length of the loose support of the fibers, with a diameter of 125 µm for example, is preferably in the range of a few millimeters, to keep changes in length caused by different temperature coefficients small and to keep the required compression forces small (a few newtons per fiber or less).

Figure 9:
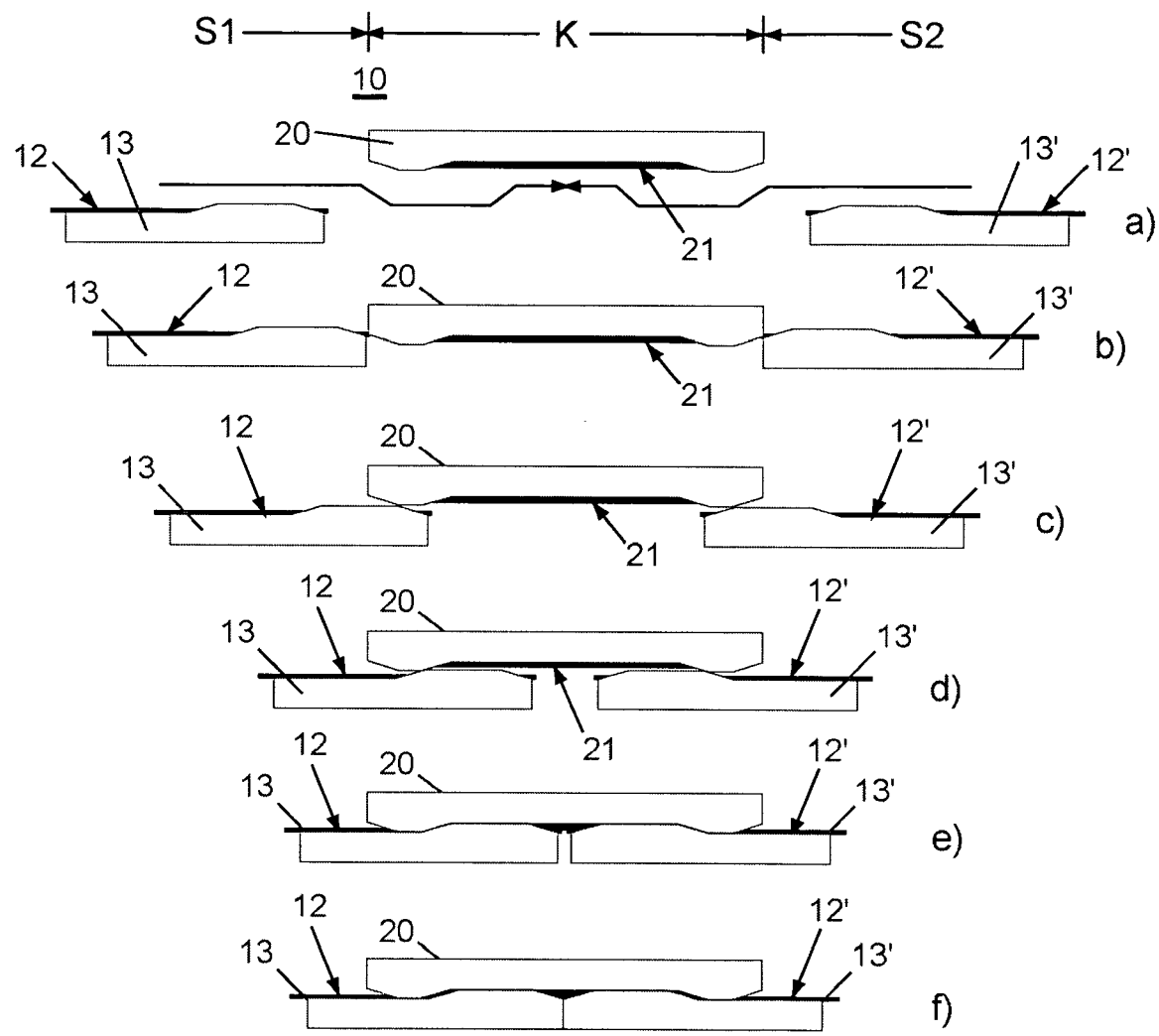
FIGS. 9a-f show the sequential stages of an inserting operation in one embodiment of the plug-in connection of the present invention.

As shown in FIG. 7 a "tracked" guide is arranged on the outer longitudinal sides of the fiber block, 13 and 13', and aligning element 20, with the variable-height guiding rails, 14 and 14', and side guides, 22 and 22', acting together with the guiding profiles 21 (see FIG. 3), which become narrower with increasing depth vertically in relation to the guiding direction, to bring about a stage-by-stage diminution of the positioning tolerances during the plugging operation (see the plugging sequence depicted in FIG. 9). However, is is also conceivable to realize the diminution of the tolerances linked with the inserting operation in some other way, for example by the use of a variable-width component or by a profile of its own on the outer sides of the fiber blocks, 13 and 13'. It is also conceivable to form other guiding means at a different location of the plug-in connection instead of the guiding rails, 14 and 14', and side guides, 22 and 22'.

The coupled relative movement of the aligning element 20 and the fiber block, 13 and 13', makes it possible for the individual fibers, 12 and 12', to slide in a defined manner into the provided guiding profiles 21, which are accommodated in a plateau 23 on the underside of the aligning element 20 (see FIG. 3). Since the relative movement only takes place immediately before contact between the fibers to be coupled, this avoids the fibers 12 and 12' undergoing friction over a lengthy distance in the guiding profiles 21. Moreover, the individual fibers 12 and 12' can compensate for the remaining positional tolerances by individual alignment. When the fibers 12 and 12' lie completely against the side walls of the guiding profiles 21, and the necessary vertical holding force is present, the fibers 12 and 12' are compressed in the longitudinal direction until there is contact at the end faces of the fiber blocks involved.

Figure 5:
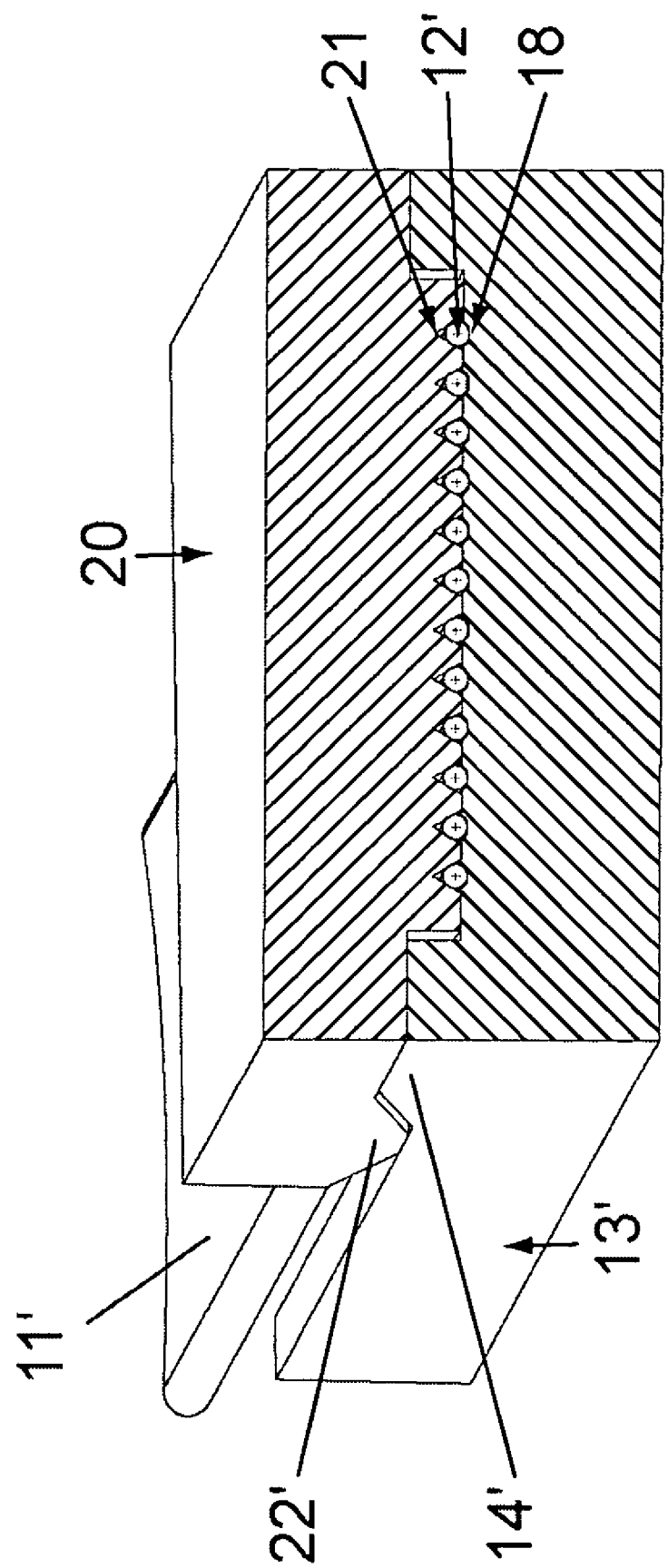
FIG. 5 shows a cross section of the arrangement shown in FIG. 4 in the region of the free length of the fibers.

The fiber block 13 receives the fiber bundles or arrays of a group of fibers, which in the present example comprises fibers 12, as shown in FIG. 7. The fibers 12 are cemented in place in a rear part 15 of fiber block 13 up to the fiber holding comb 16 (see also FIG. 2). In the front part of the fiber block 13, the fibers 12 lie with a free length roughly guided in fiber grooves 18 (see also FIGS. 2 and 5). The fiber grooves 18 serve for the rough pre-positioning of the fibers 12, the shape of the fiber grooves 18 being such that the fibers, which have a diameter of 125 µm for example, can move laterally with an order of magnitude of ±10 µm.

Figure 10:
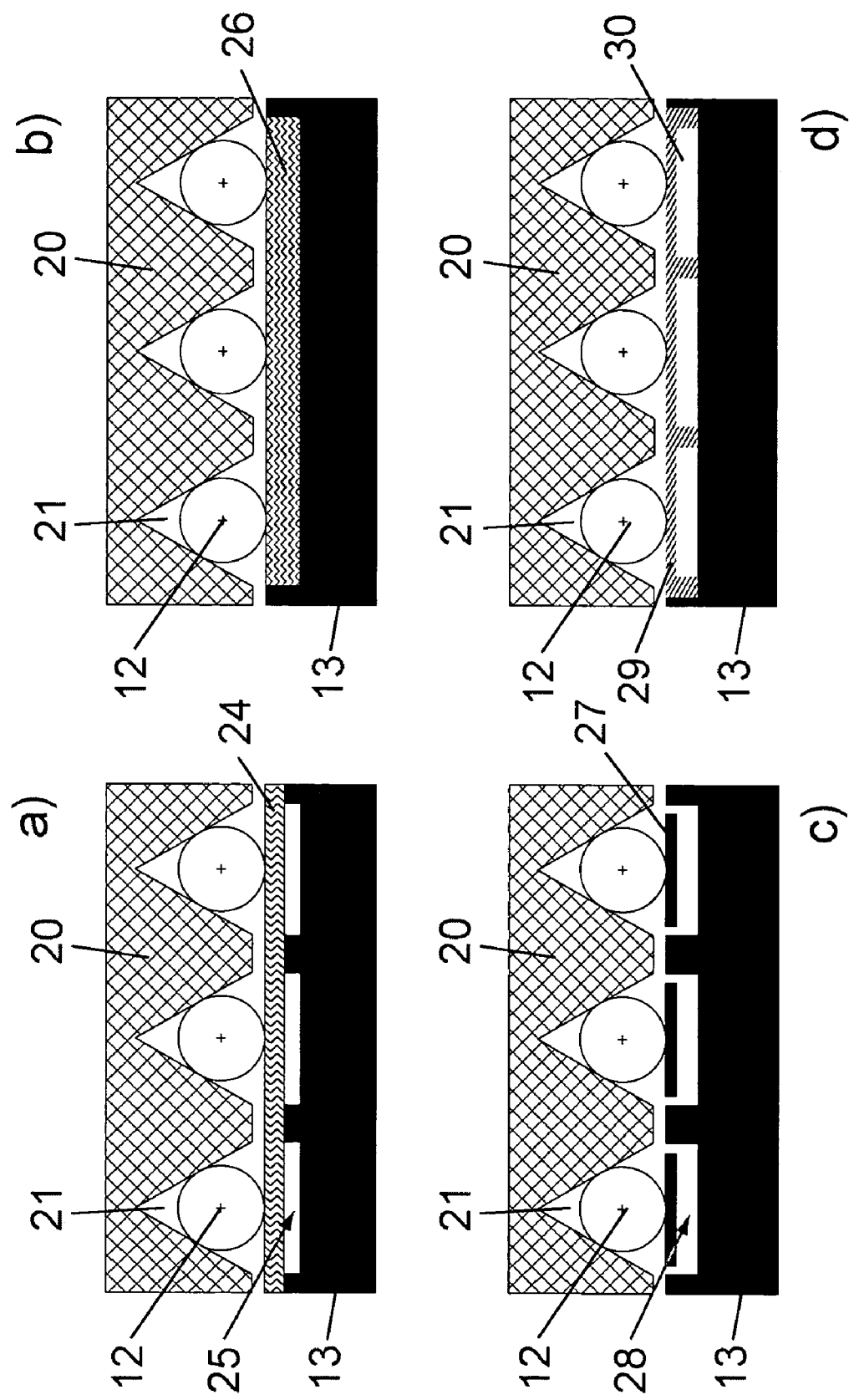
FIGS. 10a, b and d show various embodiments of elastic fixing elements for fixing the fibers in the V-shaped guiding profiles of the aligning element.
FIG. 10c shows an embodiment with a spring element for fixing the fibers in the V-shaped guiding profiles of the aligning element.

As an alternative to the fiber grooves 18, the following variants may also be used as an underlying surface, several of which are shown in FIG. 10:

A planar and unstructured base area (not depicted).
A structured base area provided with recesses 25 and with a placed-on elastic membrane 24 as shown in FIG. 10a.
An unstructured base area with a thin elastic layer 26 of a suitable material as shown in FIG. 10b.
A structured base area provided with recesses 28, with spring elements 27 formed directly on the block shown in FIG. 10c.
A flexible structure element 29 subsequently fitted into a recess 30 as shown in FIG. 10d, as proposed, for example, in a different connection in U.S. Pat. No. 6,132,105.

Figure 6:
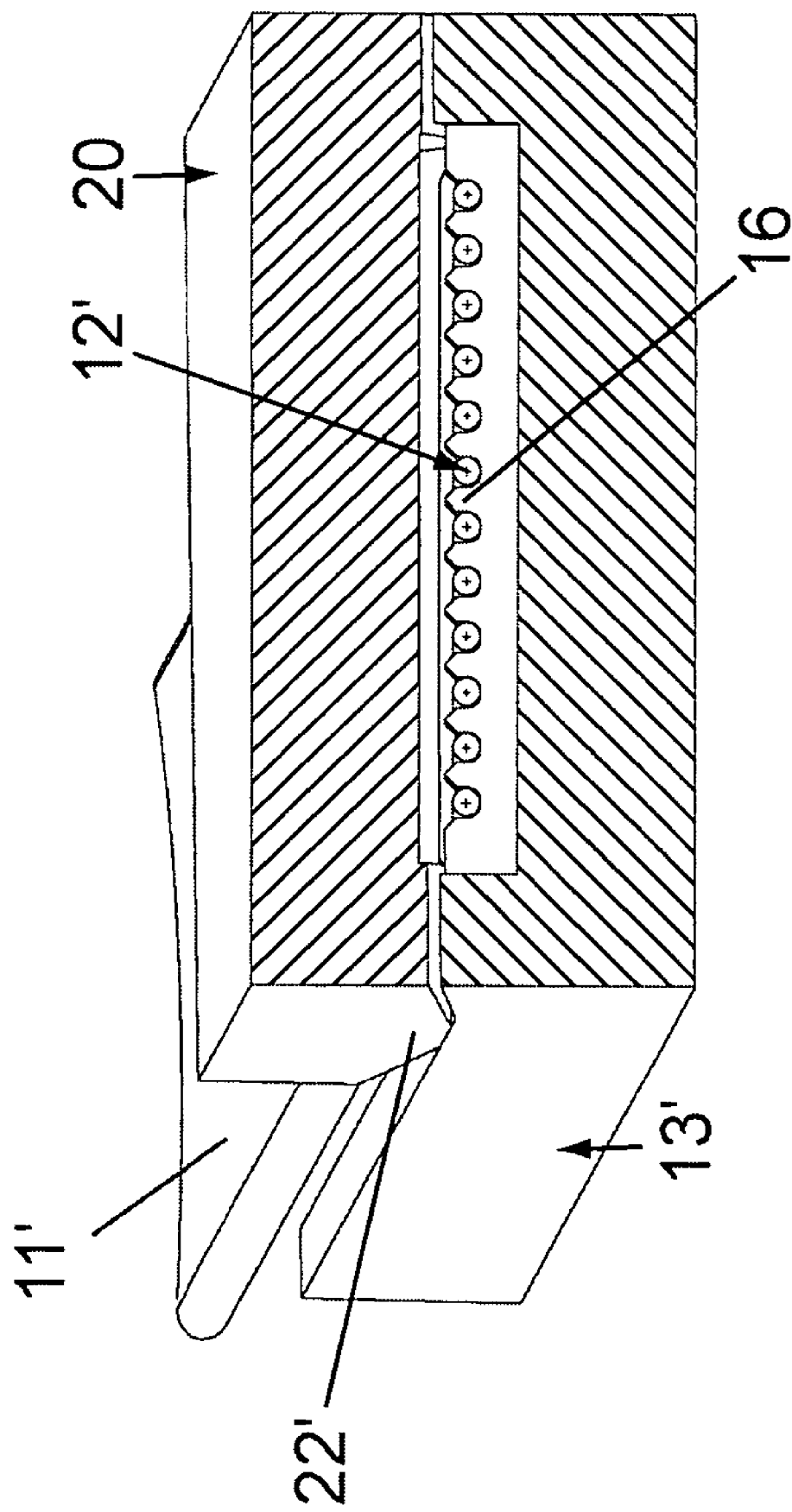
FIG. 6 shows a cross section of the arrangement shown in FIG. 4 in the region of the trench-like depression behind the fiber holding comb.

The geometry of the fiber holding comb 16 and 16' is intended to make it easier for the fibers, 12 and 12' to be placed in and to close off the adhesive bonding location toward the front part of the fiber block 13 and 13' (see FIG. 6). Therefore, as shown in FIG. 2, the fiber holding comb, 16 and 16', is directly adjoined by a transversely running trench-like depression 19 as an adhesive stop (capillary barrier).

The fibers, 12 and 12', are cemented into the fiber block, 13 and 13', or are worked after cementing, in such a way that an exact overhang of the fiber ends beyond the end face 17 of the fiber block, 13 and 13', is obtained. This overhang corresponds to the compression in the inserted state of the plug-in connection 10.

For choosing the material of the fiber blocks, 13 and 13', decisive factors are primarily the mechanical stability, dimensional accuracy and, in particular, the coefficient of thermal expansion. In order that the temperature dependence of the fiber overhang can be kept as low as possible (and consequently the pressing force between the fibers ensured), the coefficients of thermal expansion of the fiber block, 13 and 13' and fibers, 12 and 12' must be adapted as well as possible. A ceramic comes into consideration in particular as a suitable material.

Figure 4:
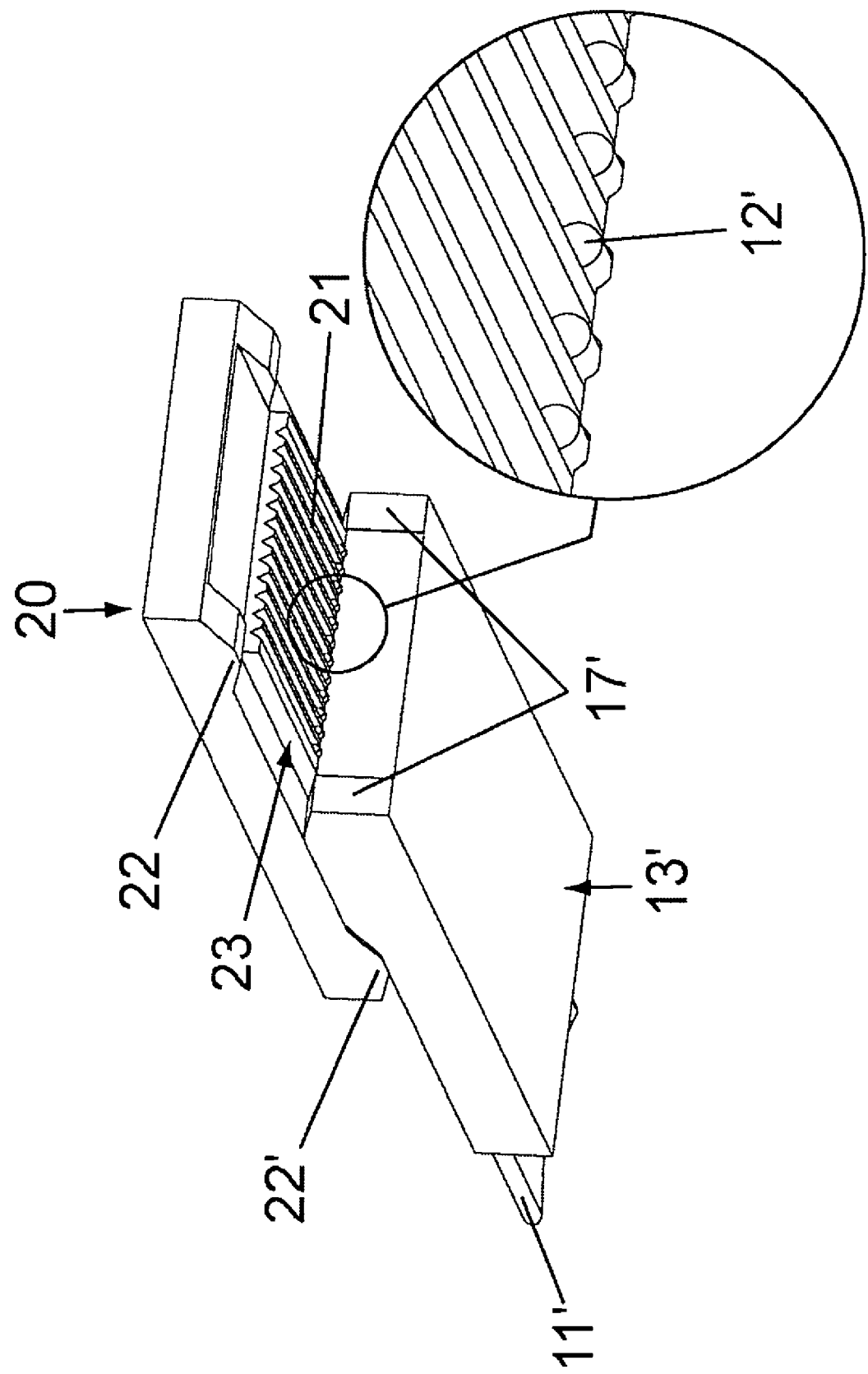
FIG. 4 shows a perspective side view of the interaction of a fiber block and the aligning element in the plug-in connection in one embodiment of the present invention.

The aligning element 20, shown in the turned-over state in FIG. 3, provides the final alignment or positioning of the fibers, 12 and 12', in the inserted state by means of corresponding guiding profiles 21 in the form of V grooves. The V grooves are symmetrically formed at any desired angle, for example an angle of 60°. The length of the guiding profiles 21, or V grooves, is chosen such that, in the inserted state, about ¾ of the free length of the fibers, 12 and 12', lies against the groove in the fiber block, 13 and 13' (see FIG. 4).

The thermal expansion of the aligning element 20 in the axial direction, (i.e. in the direction of the guiding profiles 21), is only of limited significance for the functionality of the plug-in connector 10. In the transverse direction, different expansions of several micrometers in relation to the guiding block, 13 and 13', can be accepted, since the fibers, 12 and 12', can align themselves individually. However, an adequate distance between the adhesive location (fiber holding comb, 16 and 16', or depression 19) and the beginning of the guiding profiles 21 must be maintained in order to avoid excessive shearing forces.

As already mentioned further above, during the inserting operation the fiber blocks, 13 and 13' and the aligning element 20 are mechanically coupled by the relative movements in the plug-in connection 10, making it possible for the fibers, 12 and 12', to be placed stage by stage into the guiding profiles 21 of the aligning element 20. As shown in FIG. 1, the mechanical coupling in this embodiment is by means of the variable-height guiding rails, 14 and 14', which are arranged on the longitudinal sides of the fiber blocks, 13 and 13', and comprise a higher-lying plateau 14b and two sloping ramps 14a, 14c. On insertion, these guiding rails, 14 and 14', are "run over" by the side guides, 22 and 22', formed on the underside of the aligning element 20, shown in FIG. 9.

The starting point is the configuration shown in FIG. 9a, where the fiber blocks 13 and 13' are still far away from one another in the connector parts, S1 and S2, and the aligning element 20 is raised.

As shown in FIG. 9b, when the connector parts, S1 and S2, are inserted into the coupling K, the aligning element 20 is lowered in a relative movement in such a way that, in initial contact, it rests on the front ramps 14c of the fiber blocks 13 and 13'.

As shown in FIG. 9c, as insertion proceeds, the aligning element 20 is raised in a relative movement when the front ramps 14c are run over, so that fibers 12 and 12' cannot butt with their front ends against the edges of the aligning element 20.

As shown in FIG. 9d, when the rear ramp 14a of fiber blocks, 13 and 13', is reached, aligning element 20 is slowly lowered in a relative movement, so that the fibers 12 and 12' slide into the guiding profiles 21 (V grooves) of the aligning element 20.

As shown in FIG. 9e, shortly before the end-face contact of the fiber blocks 13 and 13', the final lateral alignment of the pairs of fibers takes place in the V grooves.

As shown in FIG. 9f, by pushing the fiber blocks 13 and 13' together completely, the pairs of fibers are coupled and, on account of the overhangs, axially compressed, building up the necessary pressing pressure.

The material and production method for the fiber blocks, 13 and 13', and the aligning element 20 can be characterized as follows:

Fiber Block:

The fiber block should have the smallest possible difference in the coefficient of thermal expansion (CTE) in relation to fibers 12 and 12'. In addition, the production of the block should be inexpensive and easily manageable. Therefore, the following materials and processes may be used in various embodiments of the present invention:

Glass/quartz: best adaptation with respect to CTE; working by etching technologies in the wafer area.

Silicon: good CTE adaptation; working by etching technologies in the wafer area.

Foturan®: the photosensitive glass ceramic can be worked with lithographic and etching methods in the wafer area; relatively good CTE adaptation.

zirconia or aluminum oxide ceramic: injection molding process possible; flexible shaping; relatively good CTE adaptation; conventional machining before and after sintering possible.

Aligning Element:

The aligning element 20 need not necessarily be adapted in the CTE. However, the surface structure must be precise, in order to ensure precise alignment of the pairs of fibers. The following materials and processes may be used in various embodiments of the present invention:

Injection-molding process with high-grade polymers such as polyphenylene sulphide (PPS) or liquid crystal polymer (LCP); high dimensional accuracy; high thermal stability; comparatively good abrasion resistance; plasma coating possible; the injection molds must be produced with great precision.

Silicon: working by etching technologies in the wafer area; high accuracy achievable.

LIST OF DESIGNATIONS 10 plug-in connection
11, 11' multifiber cable
12, 12' fiber
13, 13' fiber block
14, 14' guiding rail
14a,c ramp
14b plateau (guiding rail)
15 rear part
16, 16' fiber holding comb
17 end face (fiber block)
18 fiber groove
19 depression (as adhesive barrier)
20 aligning element
21 guiding profile (axially invariant; for example V groove)
22,22' side guide
23 plateau (aligning element)
24 membrane (flexible)
25,28,30 recess
26 elastic layer
27 spring element
29 structure element (flexible)
K coupling
S1,S2 connector part

The invention claimed is:

1. A method for releasably connecting two groups of individual optical fibers, which are arranged in parallel and delimited by end faces that are arranged in a plane transverse to the main axis of the fibers, and in which individual fibers are aligned in pairs, the method comprising the steps of:
providing a plurality of fiber blocks, each having a plurality of individual lateral guiding geometries formed therein;
assigning each of the two groups of individual optical fibers to one of the fiber blocks;
aligning each individual fiber within a respective one of the individual lateral guiding geometries;
firmly connecting each of the two groups to the associated fiber block, such that a free length of each fiber lies movably in the associated fiber block before a pair wise alignment of the fibers of the two groups;
pair wise aligning the fibers of the two groups, whereby the individual fibers of the two groups are linearly fixed and secured in the lateral direction over their free length during alignment;
moving the groups of fibers toward each other until the end face of each fiber in one group abuts against the end face of a corresponding fiber from the other group; and
compensating for differences in fiber lengths by axially compressing the fibers linearly in the axial direction over the free length of the fibers.

2. The method of claim 1, wherein each of the fiber blocks has an end face that is oriented transversely in relation to the fiber axis, and the fibers lying on the fiber block are cut in such a way that they overhang the end face of the fiber block, and the two fiber blocks are pressed with their end faces against one another in such a way that the overhanging fibers are compressed in the axial direction for connecting the two groups of fibers.

3. The method of claim 2, wherein the overhang of the fibers beyond the end faces of the fiber blocks is several micrometers.

4. The method of claim 3, wherein the overhand of said fibers beyond the end faces of said fiber blocks is between 5 and 20 micrometers.

5. The method of claim 1, wherein an aligning element is used for aligning and fixing the fibers, the aligning element extending in the axial direction substantially over the free lengths of both fibers of a pair of fibers to be connected and having for each pair of fibers a guiding profile that runs in the axial direction.

6. The method of claim 5, wherein the aligning element for aligning and fixing the fibers is lowered onto the fiber blocks on a relative movement transverse to the axial direction until the fibers lie in pairs in the associated guiding profile and are laterally fixed.

7. The method of claim 6, wherein the movement of the aligning element in relation to the fiber blocks is coupled with the relative movement of the fiber blocks in relation to one another.

8. The method of claim 7, wherein the coupling of the movements of the fiber blocks and of the aligning element is by means of lateral guiding geometries on the fiber blocks and side guides acting with them on the aligning element.

9. The method of claim 5, wherein the guiding profiles in the aligning element are formed in a V-shaped manner that becomes narrower with increasing vertical depth in relation to the guiding direction, and during the alignment and fixing, the pairs of fibers are pressed into the guiding profiles by an elastically deformable means attached to the fiber blocks.

10. The method of claim 5, wherein said guiding profile is axially invariant.

11. The method of claim 1, wherein each group of fibers is firmly connected to the associated fiber block by one of adhesive bonding and casting.

12. A plug-in connection comprising:
a coupling;
two connector parts, each connector part having at least one fiber block having a plurality of individual lateral guiding geometries formed therein, said connector parts being inserted from opposite sides into the coupling;
a group of fibers fixed in each respective fiber block, such that individual fibers of each group are accommodated in a respective one of the individual lateral guiding geometries are movably supported over a predetermined free length on an associated fiber block in the connector parts, and are compressed in the axial direction when the connector parts are inserted into the coupling; and
aligning means provided in the coupling to align the fibers of the two groups in pairs, to linearly fix and secure them in the lateral direction over their free length, and to provide for a linear, elastic compression of the fibers over their free length when the connector parts are inserted into the coupling.

13. The plug-in connection of claim 12, wherein the aligning means in the coupling comprises an aligning element which is movably supported transversely in relation to the axial direction of the fiber blocks and has a guiding profile that runs in the axial direction for each of the pairs of fibers, on a side facing the fibers.

14. The plug-in connection of claim 13, wherein the plug-in connection is formed in such a way that the aligning element performs a movement transverse to the axial direction that is coupled with the relative movement of the fiber blocks when the connector parts are inserted into the coupling.

15. The plug-in connection of claim 14, wherein coupling means are provided for coupling the movements of the fiber blocks and the aligning element.

16. The plug-in connection of claim 15, wherein the fiber blocks have guiding geometries extending in the axial direction on the longitudinal sides, which interact in a guiding manner with the aligning element when the connector parts are inserted as a coupling means.

17. The plug-in connection of claim 13, wherein the guiding profiles of the aligning element are formed as V-shaped grooves, and fiber blocks act together with the guiding profiles to bring about the alignment and lateral fixing of the fibers.

18. The plug-in connection of claim 17, wherein the aligning and fixing means comprise axially running fiber grooves.

19. The plug-in connection of claim 17, wherein the aligning and fixing means comprise elements that are elastically deformable transversely in relation to the axial direction.

20. The plug-in connection of claim 19, wherein the elastically deformable elements comprise one of a flexible membrane, an elastic layer, an individual spring element, and a flexible structure element.

21. The plug-in connection of claim 13, wherein the aligning element is produced from a plastic by an injection-molding process.

22. The plug-in connection of claim 13, wherein said guiding profile is axially invariant.

23. The plug-in connection of claim 12, wherein each of the fiber blocks has an end face oriented transversely in relation to the fiber axis, and the fibers lying on the fiber block are cut in such a way that they overhang the end face of the fiber block.

24. The plug-in connection of claim 23, wherein the overhang of the fibers beyond the end faces of the fiber blocks is several micrometers.

25. The plug-in connection of claim 24, wherein the overhang of said fibers beyond the end faces of said fiber blocks is between 5 and 20 micrometers.

26. The plug-in connection of claim 12, wherein the groups of fibers are adhesively bonded with the fiber blocks, the fibers of each group being guided by fiber holding combs which are formed on the fiber blocks, limit the adhesive bonding in the axial direction and determine the free length of the fibers.

27. The plug-in connection of claim 26, wherein a transversely running trench-like depression is provided as an adhesive barrier behind each of the fiber holding combs in the plugging direction.

28. The plug-in connection of claim 12, wherein the fiber blocks consist of a dimensionally stable material that has a coefficient of thermal expansion similar to the fibers and are cut to length in a suitable way at the end faces.

29. The plug-in connection of claim 28, wherein the fiber block end faces are polished.

30. The plug-in connection of claim 26, wherein the dimensionally stable material is a ceramic.

31. A method for releasably connecting two groups of individual optical fibers, which are arranged in parallel and delimited by end faces that are arranged in a plane transverse to the main axis of the fibers, and in which individual fibers are aligned in pairs, the method comprising the steps of:
providing a plurality of fiber blocks;
assigning each of the two groups to an associated fiber block;
connecting the groups to the associated fiber blocks;
movably supporting the individual fibers of the two groups over a predetermined free length;
providing an alignment element extending in an axial direction substantially over the free length of both fibers of a pair of fibers to be connected and having for each pair of fibers a guiding profile that runs in the axial direction;

lowering the alignment element onto the fiber blocks on a relative movement transverse to the axial direction until the fibers lie in pairs in the associated guiding profile;

moving the groups of fibers toward each other until the end face of each fiber in one group abuts against the end face of a corresponding fiber from the other group;

compensating for differences in fiber lengths by axially compressing the fibers linearly in the axial direction over the free length of the fibers; and linearly fixing and securing the individual fibers of the two groups in the lateral direction over their free length during alignment.

32. A method for releasably connecting two groups of individual optical fibers, which are arranged in parallel and delimited by end faces that are arranged in a plane transverse to the main axis of the fibers, and in which individual fibers are aligned in pairs, the method comprising the steps of:

providing a plurality of fiber blocks;

assigning each of the two groups to an associated fiber block;

connecting the groups to the associated fiber blocks;

movably supporting the individual fibers of the two groups over a predetermined free length;

providing an alignment element extending in an axial direction substantially over the free length of both fibers of a pair of fibers to be connected and having for each pair of fibers a guiding profile that runs in the axial direction, the guiding profiles being formed in a V-shaped manner that becomes narrower with increasing vertical depth in relation to the guiding direction;

pressing the pairs of fibers into the guiding profiles by an elastically deformable means attached to the fiber blocks;

moving the groups of fibers toward each other until the end face of each fiber in one group abuts against the end face of a corresponding fiber from the other group;

compensating for differences in fiber lengths by axially compressing the fibers; and fixing the individual fibers of the two groups in the lateral direction over a predominant part of their free length during alignment.

33. A plug-in connection comprising:

a coupling;

two connector parts, which can be inserted from opposite sides into the coupling and in which a group of fibers is accommodated, such that the fibers of each group are movably supported over a predetermined free length on an associated fiber block in the connector parts and the fibers are compressed in the axial direction when the connector parts are inserted into the coupling; and aligning means provided in the coupling to align the fibers of the two groups in pairs, to linearly fix and secure them in the lateral direction over their free length, and to provide for a linear, elastic compression of the fibers over their free length when the connector parts are inserted into the coupling, wherein the groups of fibers are adhesively bonded with the fiber blocks, the fibers of each group being guided by fiber holding combs which are formed on the fiber blocks, limit the adhesive bonding in the axial direction and determine the free length of the fibers.

34. A plug-in connection comprising:

a coupling;

two connector parts, which can be inserted from opposite sides into the coupling and in which a group of fibers is accommodated, such that the fibers of each group are movably supported over a predetermined free length on an associated fiber block in the connector parts and the fibers are compressed in the axial direction when the connector parts are inserted into the coupling; and aligning means provided in the coupling to align the fibers of the two groups in pairs, to linearly fix and secure them in the lateral direction over their free length, and to provide for a linear, elastic compression of the fibers over their free length when the connector parts are inserted into the coupling, wherein the fiber blocks consist of a dimensionally stable material that has a coefficient of thermal expansion similar to the fibers and are cut to length in a suitable way at the end faces.

35. A plug-in connection comprising:

a coupling;

two connector parts, which can be inserted from opposite sides into the coupling and in which a group of fibers is accommodated, such that the fibers of each group are movably supported over a predetermined free length on an associated fiber block in the connector parts and the fibers are compressed in the axial direction when the connector parts are inserted into the coupling; and aligning means provided in the coupling to align the fibers of the two groups in pairs, to linearly fix and secure them in the lateral direction over their free length, and to provide for a linear, elastic compression of the fibers over their free length when the connector parts are inserted into the coupling, said alignment means comprising an aligning element which is movably supported transversely in relation to the axial direction of the fiber blocks and has a guiding profile formed as V-shaped grooves that runs in the axial direction for each of the pairs of fibers, on a side facing the fibers, wherein the fiber blocks act together with the guiding profiles to bring about the alignment and lateral fixing of the fibers, wherein the aligning means comprise elements that are elastically deformable transversely in relation to the axial direction, the elastically deformable elements comprise one of a flexible membrane, an elastic layer, an individual spring element, and a flexible structure element.

36. A method for releasably connecting two groups of individual optical fibers, which are arranged in parallel and delimited by end faces that are arranged in a plane transverse to the main axis of the fibers, and in which individual fibers are aligned in pairs, the method comprising the steps of:

providing a plurality of fiber blocks;

assigning each of the two groups to an associated fiber block;

connecting the groups to the associated fiber block by one of adhesive bonding and casting;

movably supporting the individual fibers of the two groups over a predetermined free length;

moving the groups of fibers toward each other until the end face of each fiber in one group abuts against the end face of a corresponding fiber from the other group;

compensating for differences in fiber lengths by axially compressing the fibers linearly in the axial direction over the free length of the fibers; and linearly fixing and securing the individual fibers of the two groups in the lateral direction over their free length during alignment.

* * * * *

UNITED STATES PATENT AND TRADEMARK OFFICE
CERTIFICATE OF CORRECTION

| | |
|---|---|
| PATENT NO. | : 7,325,979 B2 |
| APPLICATION NO. | : 11/343285 |
| DATED | : February 5, 2008 |
| INVENTOR(S) | : Thomas Ammer et al. |

Page 1 of 1

It is certified that error appears in the above-identified patent and that said Letters Patent is hereby corrected as shown below:

<u>Column 12</u>

*Line 51*: please change "claim 26" to --claim 29--

Signed and Sealed this

Tenth Day of June, 2008

JON W. DUDAS
*Director of the United States Patent and Trademark Office*